May 11, 1954   E. C. KRADOSKA   2,678,079
LID FORMING AND RECONDITIONING MACHINE
Filed Nov. 14, 1951   8 Sheets-Sheet 1

Fig.1

INVENTOR.
Edward C. Kradoska
BY
Louis Necho
Attorney

May 11, 1954  E. C. KRADOSKA  2,678,079
LID FORMING AND RECONDITIONING MACHINE
Filed Nov. 14, 1951  8 Sheets-Sheet 3

Fig. 3

INVENTOR.
Edward C. Kradoska
BY
Louis Necho
Attorney

May 11, 1954 — E. C. KRADOSKA — 2,678,079
LID FORMING AND RECONDITIONING MACHINE
Filed Nov. 14, 1951 — 8 Sheets-Sheet 4

INVENTOR.
Edward C. Kradoska
BY Louis Necho
Attorney

INVENTOR.
Edward C. Kradoska
BY
Louis Necho
Attorney

May 11, 1954 E. C. KRADOSKA 2,678,079
LID FORMING AND RECONDITIONING MACHINE
Filed Nov. 14, 1951 8 Sheets-Sheet 8

INVENTOR.
Edward C. Kradoska
BY
Louis Necho
Attorney

Patented May 11, 1954

2,678,079

UNITED STATES PATENT OFFICE 2,678,079

LID FORMING AND RECONDITIONING MACHINE

Edward Charles Kradoska, Melrose Park, Pa.

Application November 14, 1951, Serial No. 256,261

18 Claims. (Cl. 153—9)

My invention relates to the art of making, or of reconditioning the lids, or end closures, of steel drums and similar containers.

The object of the invention is to produce an improved apparatus which can be used for making new lids and for repairing old lids of the type set forth.

When used for repairing an old lid, my improved apparatus acts on the body of the lid to remove indentations therefrom, and it re-rolls the bead on the rim of the lid. When used for making flat lids, the apparatus acts on a new blank to give it the desired dished configuration and it rolls the edge of the blank to form a peripheral bead thereon.

In both operations, my improved apparatus, except for manual starting and stopping and manual feeding and removal of the lid or blank to be operated on, is wholly automatic.

The full nature and advantage of my improved apparatus will be apparent from the following specification and the accompanying drawings in which.

Figure 1:
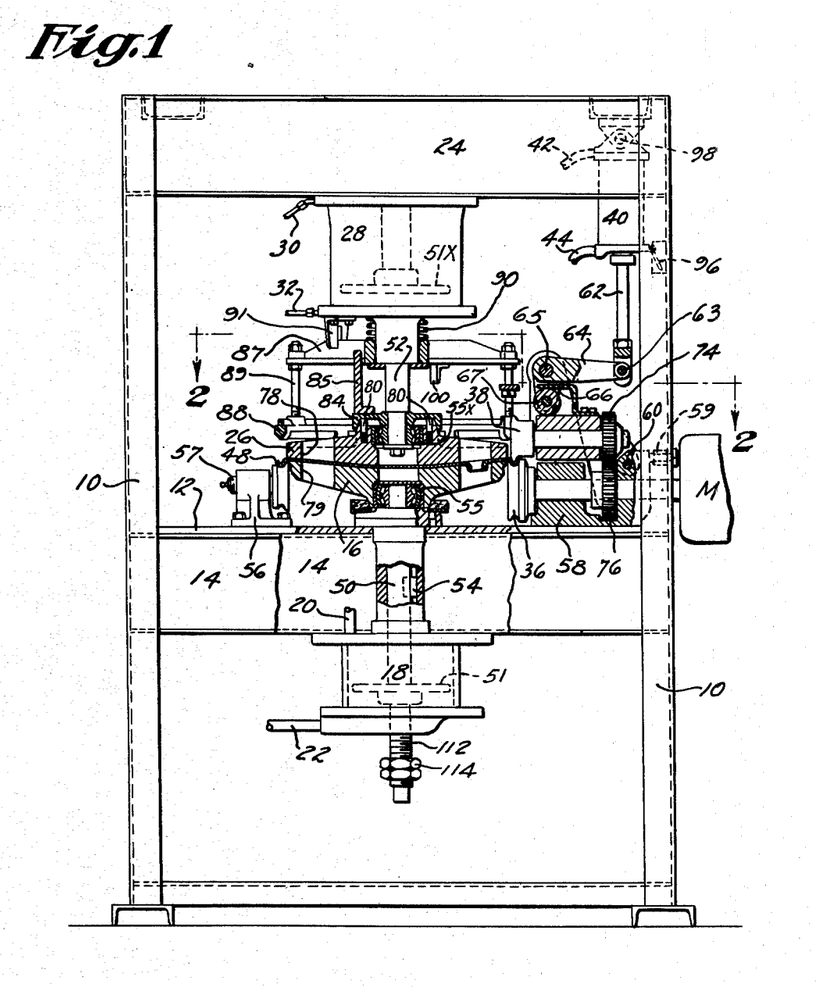
Fig. 1 is a front elevational view of my improved apparatus as adapted for reconditioning used lids, the same being shown in the last stage of operation.
Figure 2:
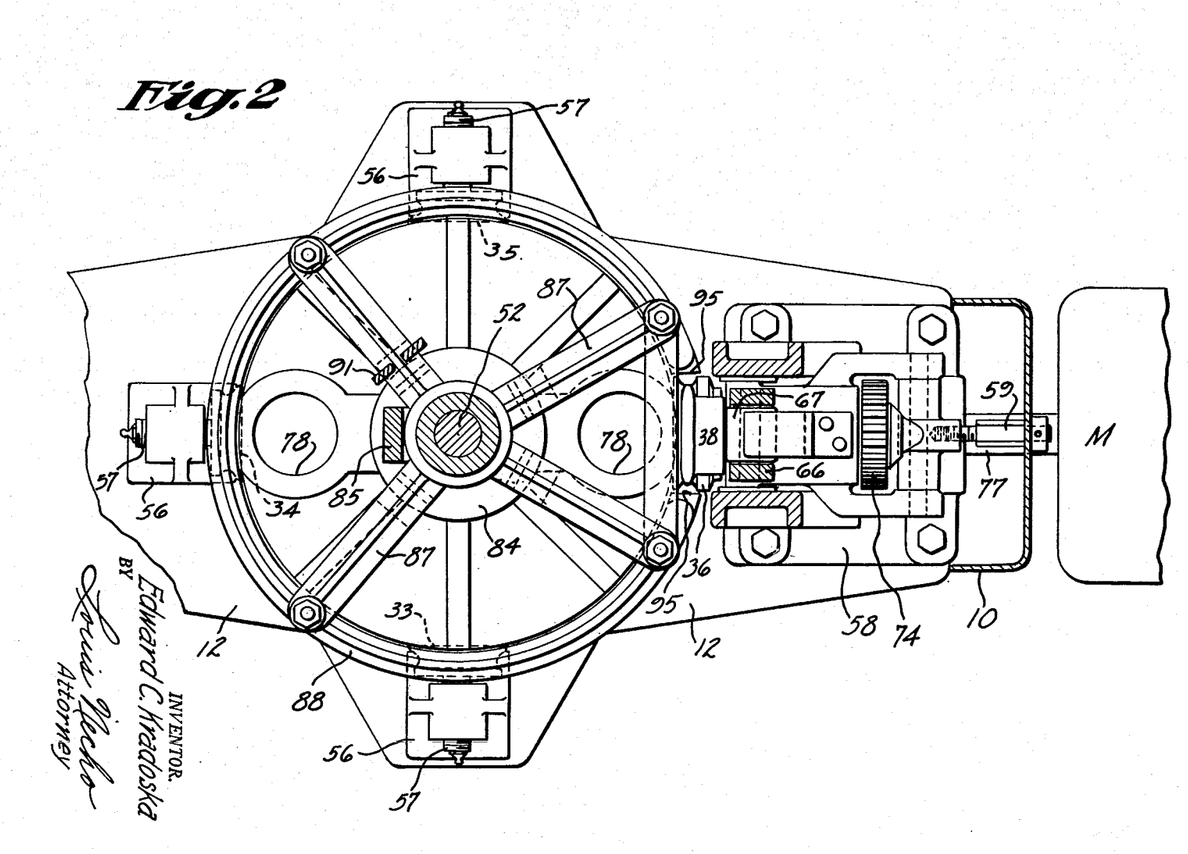
Fig. 2 is a sectional view looking in the direction of line 2—2 on Fig. 1.
Figure 3:
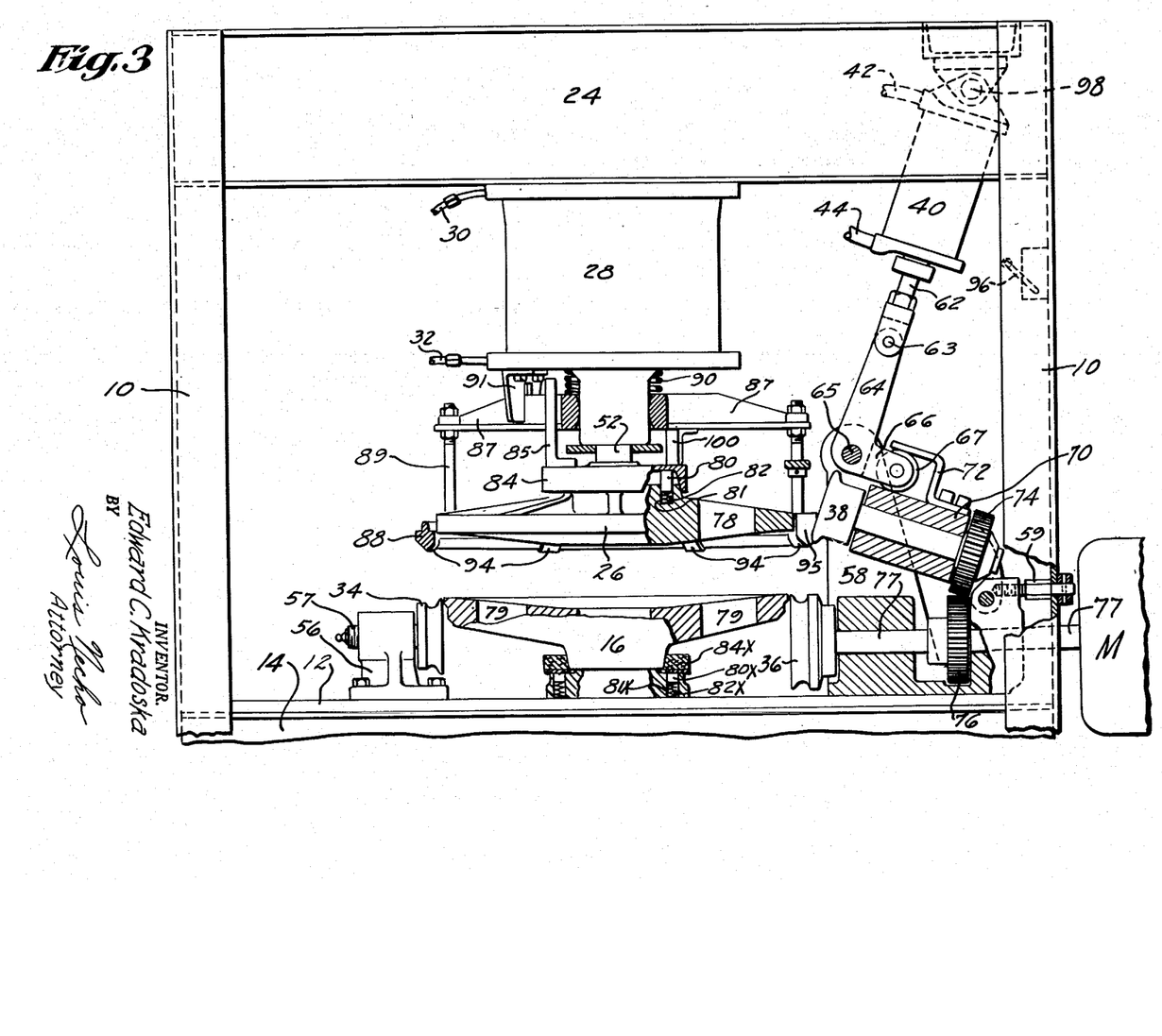
Fig. 3 is an enlarged view of the central portion of Fig. 1 showing the apparatus empty and before the beginning of a cycle of operation.

The apparatus in Figs. 1 to 6 includes a supporting farme 10 and a working platform or base 12 supported on a lower beam 14 which is carried by the frame. The lower beam 14 supports a lower platen 16 and an actuating double acting cylinder 18 the opposite sides of which are connected to a source of fluid under pressure through pipes 20 and 22. The frame also includes an upper beam 24 which supports an upper platen 26 and an actuating double acting cylinder 28 the opposite sides of which are connected to a source of fluid under pressure through pipes 30 and 32. The apparatus further includes a plurality of freely rotating idle rolls 33, 34 and 35, and coacting, driven rolls 36 and 38 (Figs. 2 and 3). The roll 36 is driven by a reversible motor M and roll 38 is moved into and out of engagement with roll 36 by a double acting cylinder 40 the opposite sides of which are connected to a source of fluid under pressure through pipes 42 and 44 in the manner hereinafter set forth.

An apparatus such as that described operates as follows:

The lower and upper platens are moved apart and the forming roll 38 is raised out of engagement with driven roll 36 (see Fig. 3); a used lid 48 to be reconditioned is placed on the lower platen (see Fig. 4); the lower platen is raised into abutment with the upper platen to clamp the lid under pressure simultaneously to de-dent the lid and give it desired dished or concave form; the platens and the lid are moved downwardly to bring the curl at the rim of the lid into engagement with idle rolls 33 to 35 and driven roll 36, and finally the forming roll 38 is moved down into engagement with roll 36 to roll the curl of the lid. (See Fig. 6.) After the lid has been reconditioned, the upper and lower platens are moved to the position of Fig. 4 and the lid is removed. The apparatus is now ready to begin a new cycle of operation.

The lower platen 16 is carried by the piston rod 50 which is actuated by the piston 51 of lower air cylinder 18, and the upper platen 26 is carried by a piston rod 52, which is actuated by the piston 51X, of the upper air cylinder 28. Piston rod 50 is keyed against rotation, as at 54 and the lower platen 16 is freely rotatable on antifriction bearings 55. (See Fig. 1.) The upper platen 26 is freely rotatable on spherical bearings 55X which permit self alignment of the upper platen. The structures of the key 54 and of the bearings 55 and 55X are conventional and are therefore not shown nor described in detail. The rolls 33, 34 and 35 are mounted on pedestals 56 and the shafts 57 of these rolls threadedly engage the pedestals whereby the rolls may be moved towards, or away from, the axis of rotation of the platens to adjust the apparatus to lids of varying diameters. Likewise, forming roll 33 and driven roll 36 are mounted, as a unit, on a pedestal 58 and are movable jointly by means of adjustment bolt 59 toward, and away from, the axis of rotation of the platens to conform to the adjustment of the rolls 33, 34 and 35.

The forming roll 38 is pivoted as at 60 so as to be movable from the position of Fig. 1 to the position of Fig. 3 by the action of air cylinder 40. As will be best seen from Fig. 3, the piston rod 62 of air cylinder 40 is pivoted at 63 to a lever 64 which is pivoted at 65 to the top of pedestal 58 and which has an arm 66 which carries a freely rotating roll 67. The bearing 70 of forming roll 38 is provided with an arm 72 which overlies roll 67, Fig. 3. By this construction, when the piston rod 62 moves outwardly and downwardly relative to air cylinder 40 the parts will assume the position shown in Fig. 1 in which forming roll 38 engages the roll 36. Conversely, when piston rod 62 moves upwardly and inwardly relative to air cylinder 40, the parts assume the position shown in Fig. 3 in which roll 38 is out of engagement with roll 36. The roll 38 is driven by means of a gear 74 which meshes with gear 76 on the motor shaft 77 which also carries roll 36. It will be noted from Fig. 3 that, even when roll 38 is out of engagement with roll 36, gear 74 continues to have partial engagement with gear 76. This insures proper meshing of gears 74 and 76 when the parts are moved from the position of Fig. 3 to the position of Fig. 1.

The upper and lower platens 26 and 16 are provided with registering identical recesses or through openings 78 and 79 respectively for accommodating the boss usually associated with the bung hole in the lid.

To prevent relative displacement of openings 78 and 79, I provide the upper platen 26 with recesses 81, Fig. 3, for receiving pins 80 which are biased by springs 82 against plates 84 carried by piston rod 52. The plate 84 is held against rotation by means of an arm 85 fixedly secured to the plate 84 and fixedly engaging spider 87 which is suitably supported below upper air cylinder 28. The lower platen 16 is similarly held against free rotation by means of pins 80X, Fig. 3, located in recesses 81X formed in the bearing housing of piston rod 50, and biased by springs 82X, against a hub 84X carried by or forming part of the lower platen 16. By this arrangement, the platens can only be rotated by the application of force sufficient to overcome the friction produced by the tension of springs 82 and 82X and will therefore rotate only when the curl of the lid is being rolled. This insures that, when the platens are parted for removal of a lid, the openings 78 and 79 will remain in registration and in the proper position for receiving the bosses of the bung holes of the next lid to be reconditioned.

In order to center a lid to be reconditioned before the lid is clamped between the two platens, I provide a centering ring 88 which is carried by bolts 89 which depend from a spider 87. The spider 87 is cushioned by spring 90 and it has a certain amount of free lateral play so to allow the centering ring to adjust itself to the irregularities usually present in a used lid. The spider is held against rotation by a yoke 91 secured to the underside of the upper air cylinder and laterally engaging a suitable portion of the spider, Fig. 4.

Figure 4:
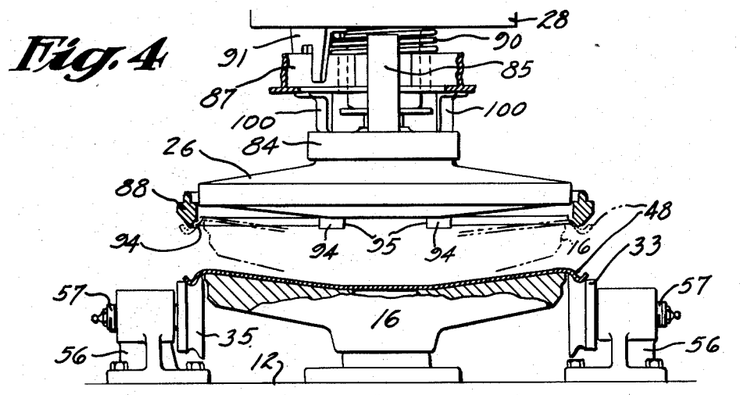
Fig. 4 is similar to Fig. 3 but showing the apparatus in the first stage of operation.

The centering ring 88 is provided with spaced, inwardly projecting lugs 94, Fig. 4, which are adapted to engage the periphery of the lid 48. This arrangement is preferred because it permits engagement of some of the lugs 94 with undistorted portions of the edge of the lid and will therefore ensure proper concentricity whereas, if the distorted edge of the lid is engaged over its entire periphery by a continuous surface it will be impossible to center the lid. By my construction, the lid can be turned around until one or more concentric, or undistorted portions thereof are engaged by one or more of the lugs 94, with the distorted portions of the edge of the ring disposed in the spaces between the lugs. It will be noted from Fig. 3 that, when the upper platen is in its uppermost position, which is always the case at the beginning of each cycle operation, the lower edge of the centering ring 88 will be well below the lower edge of the upper platen. From Fig. 2 it will be seen that centering ring 88 is not a closed circle and that its ends 95 are spaced apart a distance slightly greater than the diameter of forming roll 38 thus permitting movement of the forming roll into and out of engagement with roll 36.

Figure 5:
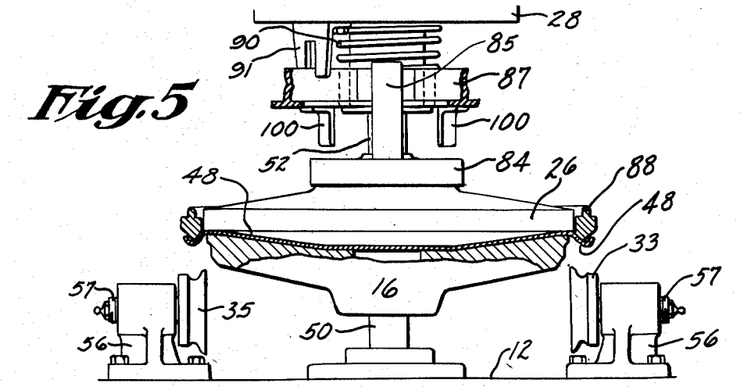
Fig. 5 is similar to Figs. 3 and 4 but showing the apparatus in the second stage of operation.

In order to permit the centering ring 88 to engage and center a lid to be reconditioned before the lid is clamped between the platens, I move the lower platen 16 up to the broken line position of Fig. 4, in which the lid is engaged and centered by the centering ring before the upper platen 26 moves down to the position of Fig. 5 in which the lid is clamped between the platens. To this end, I make the lower air cylinder 18, and its piston 51, smaller than the upper air cylinder 28, and its piston 51X, and I make pipes 20 and 22 of the lower air cylinder 18 bigger than pipes 30 and 32 of the upper air cylinder. Therefore, when air exhaust outlets leading from the lower side of upper cylinder 28 and from the upper side of lower cylinder 18 are open, and when compressed air from a common source is simultaneously admitted to the lower side of lower cylinder 18 through pipe 22 and to the upper side of upper cylinder 28 through pipe 32, two things happen: (1) The lower cylinder 18, being smaller and having a relatively large exhaust pipe 20, its upper side is exhausted much faster than the lower side of upper cylinder 28 which is larger and which has a relatively small exhaust pipe 32. This removes the downward pressure on the lower piston 51 before the upward pressure against the upper piston is relieved; (2) The lower cylinder being smaller than the upper cylinder and air inlet pipe 22 being larger than air inlet pipe 30, upward air pressure builds up against the lower piston faster than downward pressure builds up against the upper piston. Thus, the lower platen 16 moves up to the broken line position of Fig. 4 and brings the lid into contact with the centering ring just before enough air is exhausted from the lower side of the upper cylinder 28 to permit the upper platen to begin moving downwardly.

Figure 6:
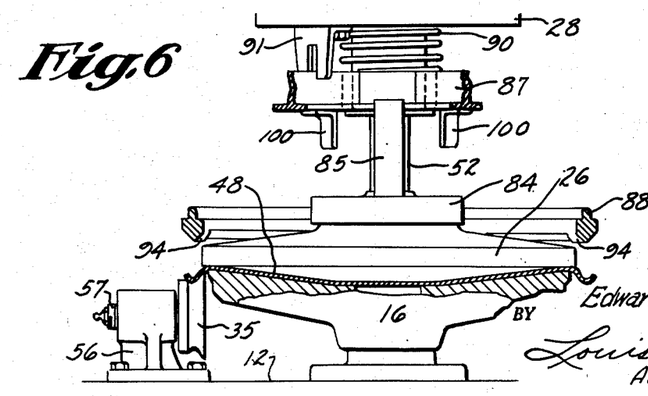
Fig. 6 is similar to Fig. 5 and shows the apparatus in its last stage of operation.
Figure 7:
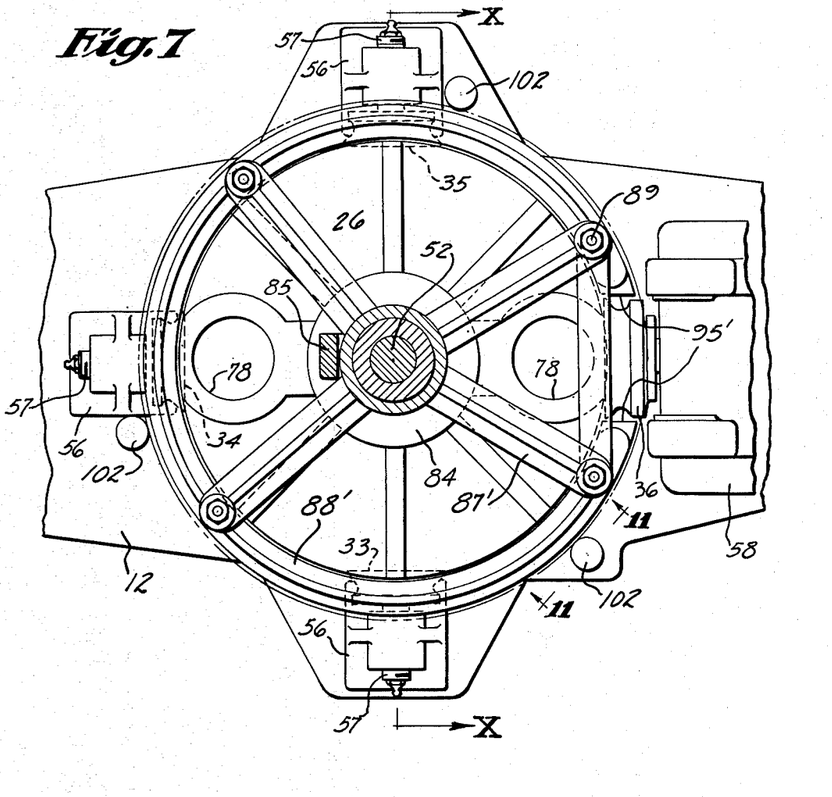
Fig. 7 is similar to Fig. 2 and shows the apparatus of Figs. 1 to 6 as adapted for making new lids.

The difference in the areas of the upper and lower pistons is also used to lower the upper and lower platens and the lid clamped therebetween to the curl-rolling position of Figs. 1 and 6. Thus, when downward air pressure against the upper piston and upward pressure against the lower piston, are at maximum value, the downward pressure on the upper piston will be greater than the upward pressure against the lower piston and therefore both platens will move down jointly. Because of the fact that the platens must move down jointly against the upward pressure exerted on the lower piston, the lid clamped between the platens will be subjected to pressure sufficient to remove dents and other deformities and to give it the desired concavity.

In order that the motor M for rotating roll 36 may be turned on and off automatically and in correlation with the movement of forming roll 38, into, and out of, engagement with roll 36, I provide a switch 96 which is normally biased to an open position by a spring not shown, and which is adapted to be moved into a closed position to energize motor M by movement of air cylinder 40 from the inclined position of Fig. 3 in which it is out of contact with the switch 96 to the position of Fig. 1 in which air cylinder 40 contacts and moves the switch to its closing position. It will be noted that air cylinder 40 is pivoted, as at 98, and that its arcuate movement is correlated with the movement of piston rod 62, lever 64 and roll 38. By this arrangement, the motor M is not energized until roll 38 engages roll 36 and the motor is deenergized as soon as roll 38 moves upwardly out of engagement with roll 36.

The centering ring 88 may be retained at all times in the lower position of Fig. 1 but, in order to increase the space available for insertion and removal of the lids to be conditioned I prefer to move, and retain, the centering ring in the upper position of Fig. 4. To this end I provide one or more lugs 100 which depend from the spider 87 and which are adapted to be engaged by the upper side of the plate 84 so that, when the platen 26 moves to its uppermost position, as in Fig. 4, it will raise the spider 87 and the centering ring 88 from the position of Figs. 1 and 5 to the position of Fig. 4.

Figure 8:
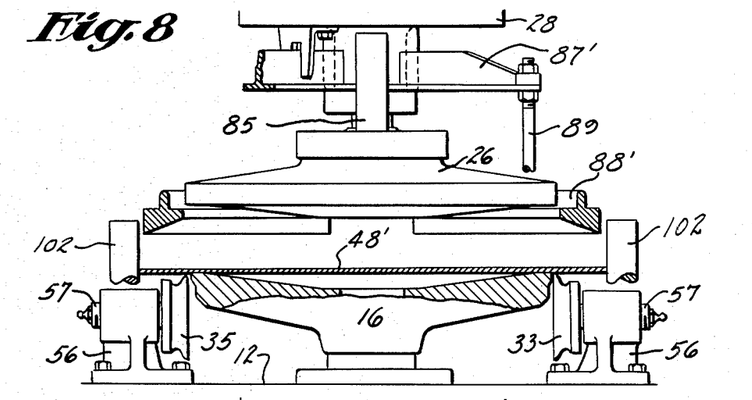
Figs. 8, 9 and 10 are sectional views taken on line X—X on Fig. 7, showing different stages in the cycle of operations.
Figure 9:
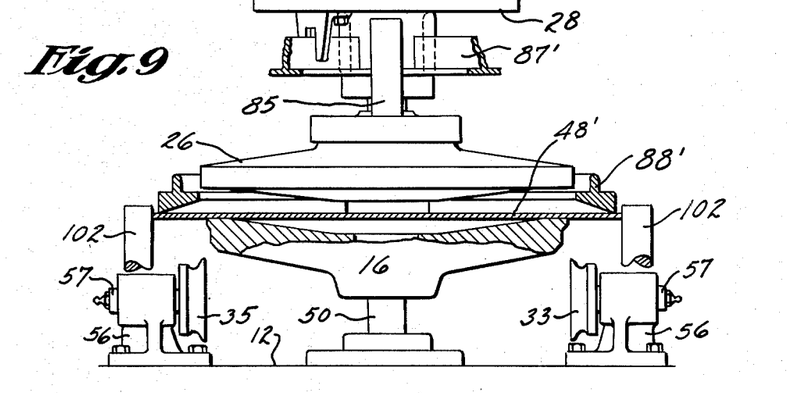
Figure 10:
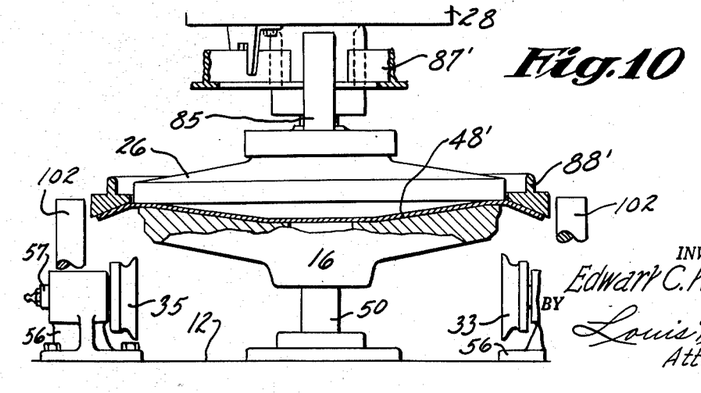

In order to facilitate the curling of the periphery of an initially flat blank 48' to be formed into a new lid, Figs. 8–10, it is desirable that the periphery of the blank be bent downwardly before the curl rolling operation shown in Fig. 1 is begun. To this end, the apparatus of Figs. 1 to 6 is altered by omission of spring 90 and by mounting a spider 87' rigidly and by suspending a forming ring 88' rigidly from the spider. The spider 87' can be rigidly mounted, or at least held against upward movement, in any suitable manner. For example, the spider 87' may be extended upwardly until it abuts the bottom of air cylinder 28, as shown in Figs. 8 to 10, or a collar may be substituted for the spring. By this arrangement, when the lower platen 16 is moved up to the position of Fig. 9, which corresponds to the position of Fig. 5, the blank is pressed against rigid ring 88' and its periphery is bent downwardly as shown in Fig. 10. This facilitates the curl rolling operation to be performed by rolls 38 and 36.

Figure 11:
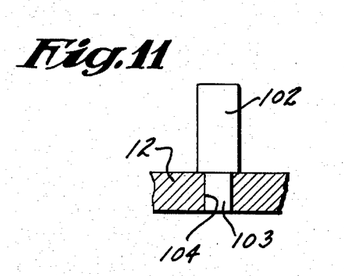
Fig. 11 is a sectional view taken on line 11 on Fig. 7.
Figure 12:
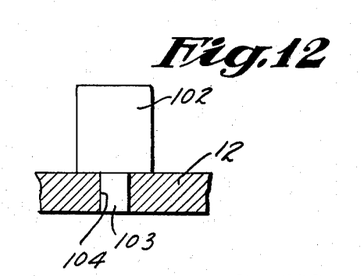
Fig. 12 is similar to Fig. 11 and shows a slight modification.

In order to properly center blank 48', three or more pins 102 are mounted on base 12 and so arranged that, when the periphery of the blank 48' contacts all of the pins, the blank will be centered relative to the platens. The pins 102 are detachably mounted by inserting their bottom, reduced ends 103 in holes 104 provided in base 12. For adjustment purposes, the bodies of the pins 102 can be made larger or smaller as shown in Figs. 11 and 12. Thus, for centering larger blanks, pins 102 of a smaller diameter are used, and vice versa. Since, in this embodiment, the forming ring 88' is stationary, the lugs 100 of Figs. 1 to 6, which, in that embodiment, served to lift ring 88 up on upward movement of upper platen 26, are omitted.

Except for the omission of spring 90 and lugs 100, and the addition of centering pins 102, the structure of the embodiment of Figs. 7 through 12 is the same as that of Figs. 1 through 6 and the parts common to both embodiments have been designated by the same reference numerals.

Figure 13:
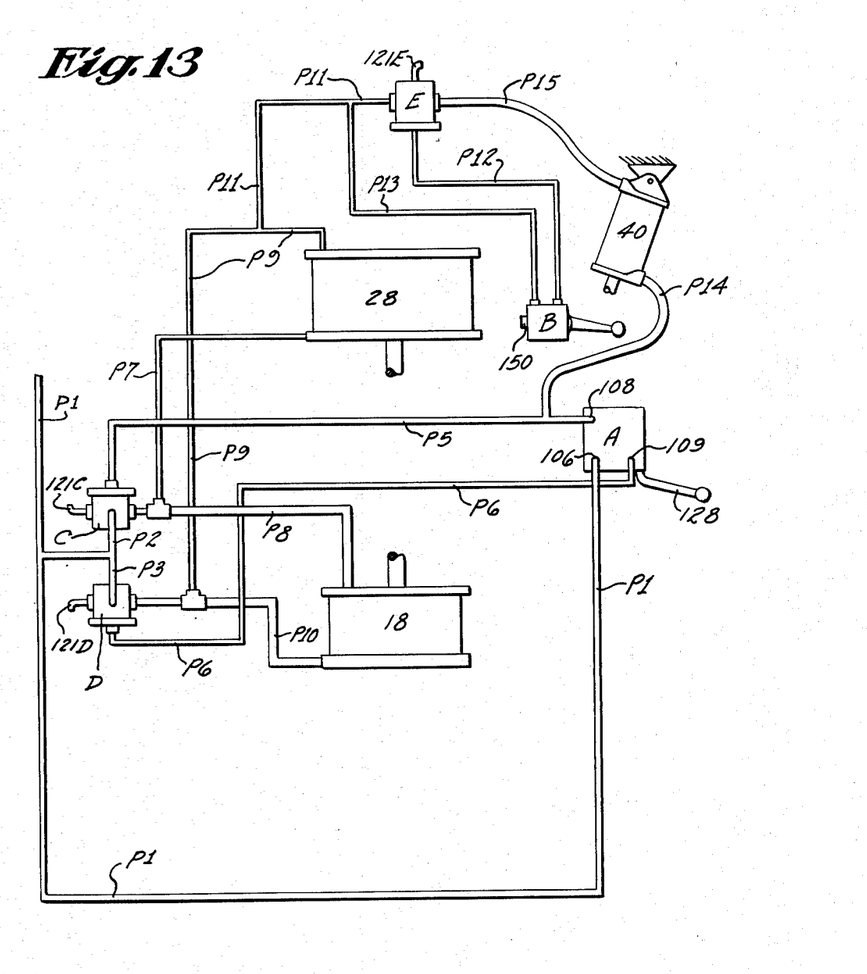
Fig. 13 is a diagrammatic view showing the pipe and valve hook up which is used in both embodiments of the apparatus.

The automatic operation of both embodiments of the invention is effected by means of valves A, B, C, D and E which are connected to each other and to the air cylinders in the manner diagrammatically shown in Fig. 13. The structure of the valves themselves is shown in Figs. 14 to 19 from which it will be seen that valve A is a standard, non-locking, two-position, four-way valve; that valves C, D and E are standard, normally closed, three way, pilot-operated valves, and that valve B is a standard three-way, two position valve.

More specifically, valve A is provided with an air inlet 106, an exhaust outlet 107, and with two other openings 108 and 109; valve C has an inlet 110 and two other openings 111 and 112; valve D has inlet opening 114 and two other openings 115 and 116; valve E has an inlet 118 and two other openings 119 and 120. Valves C, D and E also have exhaust openings which are shown in Figs. 17, 18 and 19 and which are indicated at 121C, 121D and 121E, respectively in Fig. 13.

Figures 14, 17, 18, 19:
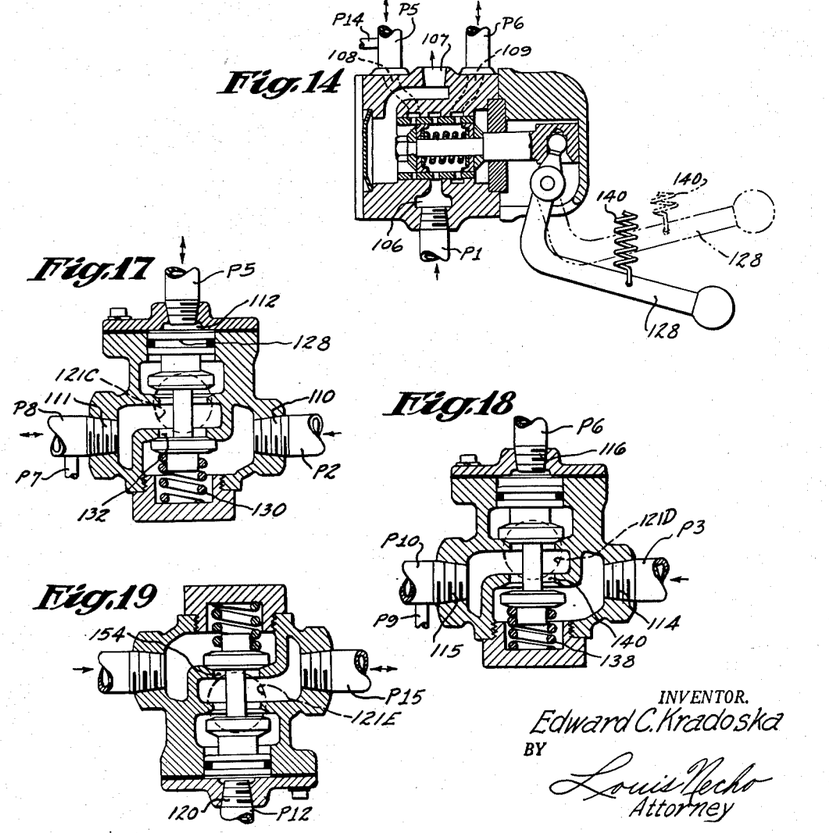
Figs. 14 through 19 are sectional views showing the structure of the various valves shown diagrammatically in Fig. 13.

It will be seen from Figs. 13 through 19, that the inlets of valves A, C and D are supplied with air under pressure through pipes P1, P2 and P3, respectively; that opening 108 of valve A is connected by means of pipe P5 to opening 112 which leads to the pilot head of valve C and that, in the position of the parts as shown in Fig. 14, opening 108 communicates with exhaust opening 107, that opening 109 of valve A is connected by means of pipe P6 to opening 116 which leads to the pilot head of valve D; that opening 111 of valve C is connected by means of relatively large pipe P8 to the upper side of lower air cylinder 18 and by means of branch pipe P7 to the underside of upper cylinder 28; that opening 115 of valve D is connected by means of pipe P10 to the underside of lower cylinder 18 and by means of branch pipe P9 to the upper side of upper cylinder 28; that pipe P10 is also connected by means of branch pipes P11 and P9 to opening 119 of valve E; that opening 119 of valve E is connected by means of pipe P15 to the upper side of air cylinder 40, that opening 120, leading to the pilot head of valve E, is connected by means of pipe P12 to opening 124 of valve B and that the inlet opening 126 of valve B is connected by means of pipe P13 to branch pipe P11 which leads through pipes P9 and P10 to valve D, and that the underside of air cylinder 40 is connected by means of pipe P14 to pipe P5 which leads to the pilot head of valve C.

With this arrangement, when it is desired to close, or to bring the platens 16 and 26 together, the handle 128 of valve A is depressed to the solid line position of Fig. 14. The air previously pressing against the pilot head 126 of valve C, and the air in the underside of cylinder 40 will be exhausted through pipes P5 and P14 and through openings 108 and 107 of valve A. This allows spring 130 to raise the pilot head of valve C to its upper position in Fig. 17 and thus interrupts the flow of air from pipe P2, through opening 132, to pipe P8. Opening 111 of valve C is now connected to exhaust 121C of valve C and therefore air from the lower side of cylinder 28 will be exhausted through pipe P7, and air from the upper side of cylinder 18 will be exhausted through pipe P8. Simultaneously, air is delivered through opening 109 and pipe P6 to the pilot head of valve D to depress the latter against action of spring 138. This permits air to flow through pipe P3, opening 140, and pipe P10 to the underside of lower air cylinder 18 and through branch pipe P9 to the upper side of upper air cylinder 28.

Figure 15:
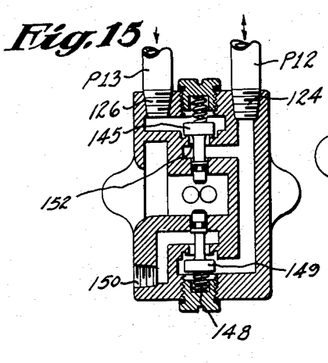
Figure 16:
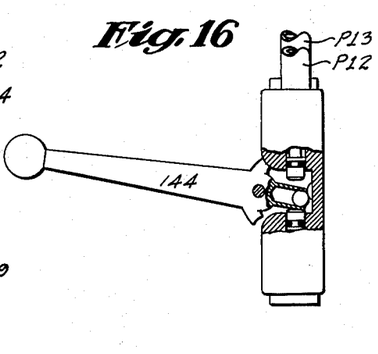

Because cylinder 28 is larger than cylinder 18, and because pipes P9 and P10 are larger than pipes P7 and P8, air will exhaust from the upper side of cylinder 18 faster than it will exhaust from the lower side of upper cylinder 28, and air pressure will build up in the lower side of cylinder 18 faster than it will in the upper side of cylinder 28. Therefore the lower platen 16 will rise to the position of Fig. 5 or 9, in which a used lid 48 is centered by ring 88 and a new lid 48' abuts member 88', before upper platen 26 begins to move downwardly. When the pressure builds up to maximum value in both cylinders, the piston of the upper cylinder being larger than that of the lower cylinder, both air cylinders move down together to the position of Fig. 6 in which the periphery of the used lid to be reconditioned or of the blank to be formed into lid rests upon rolls 33, 34, 35 and 36. With the handle 128 of valve A still depressed, against the action of spring 140, the operator now depresses handle 144 of valve B to raise valve closure 145, against the action of spring 146 and to allow spring 148 to raise valve closure 149. See Fig. 15. This closes off exhaust opening 150 from pipe P12 and allows air to flow from pipes P10, P11 and P13, through openings 125, 152 and 124, and through pipe P12 to opening 129 of valve E which leads to the pilot head of valve E, to move the valve closure of valve E to its upper position as viewed in Fig. 19. This permits air to flow through pipe P11, opening 154, opening 119 and pipe P15 to the upper side of air cylinder 40 to depress roll 38 into engagement with roll 36. The handle 144 of valve B may be spring loaded so that it will act the same as handle 128 of valve A and, upon being released, it returns automatically to the upper position of Fig. 16 in which pipe P12 is cut off from pipe P13 and in which pipe P12 communicates with exhaust 150 of valve B. It will be noted that, in moving roll 38 downwardly, air cylinder 40 also energizes reversible motor M by closing switch 96 so as to rotate roll 38.

Upon release of handle 128 of valve A, it returns to its upper position in which opening 108 is connected to air inlet 106 and pipe P1 and that opening 109 will be connected to exhaust 107. Therefore, the air in the underside of cylinder 18 and in the upper side of cylinder 28 is exhausted through pipes P9, P10 and valve D and, simultaneously valve C is opened and air is supplied through P8 and P7 to the upper side of cylinder 18 and to the underside of cylinder 28 so as to move platen 16 downwardly and platen 26 upwardly. Simultaneously air is delivered through pipe P14 to the underside of air cylinder 40 to move and retain roll 38 in its upper position.

In order to regulate the depth of the curl to be formed at the edge of a lid, the lower piston 51 is carried by an adjusting screw 112 which is provided with a lock nut 114. Thus by varying the stroke of lower piston 51, the downward movement of the platens toward the rolls 33 to 36 is likewise varied.

What I claim is:

1. A machine for shaping the lid of a metal drum, said machine including a rotary lower platen adapted to receive the lid to be shaped, a rotary upper platen, a plurality of beading rolls rotatable about fixed axes located in a plane below said upper platen, means for first effecting axial movement of said platens toward each other into a lid-clamping position above said rolls, and for subsequently moving said platens to a position in which the rim of the lid engages said rolls, a forming roll rotatable about an axis in a plane above the plane of said beading rolls, and means for driving said forming roll and at least one of said beading rolls, said driven rolls engaging the opposite sides of the rim of said lid.

2. The structure recited in claim 1 and means for preventing rotation of said platens except in response to the rotation of the two last mentioned rolls.

3. The structure recited in claim 1 and means for centering said lid on said lower platen prior to the clamping of the lid between said platens.

4. The structure recited in claim 1 in which all of said rolls are adjustable radially with reference to the axis of rotation of said platens.

5. The structure recited in claim 1 and a lid centering device located below said upper platen and in the path of movement of said lower platen whereby said lid contacts, and is centered by, said centering device prior to the clamping of the lid between said platens.

6. A machine for shaping the lid of a metal drum, said machine including a lower platen adapted to receive a lid and movable to an upper and to a lower position, an upper platen movable to an upper position and to a lower position, a double-acting air cylinder for raising and lowering said lower platen, a double acting air cylinder for raising and lowering said upper platen, a common source of compressed air, a first pair of pipes for supplying compressed air to the upper and lower sides of the lower air cylinder, a second pair of pipes for supplying compressed air to the upper and lower sides of the upper air cylinder, said second pair of pipes being smaller than said first pair of pipes whereby air pressure is built up in, or is exhausted from the opposite side of said lower cylinder more quickly than air pressure is built up in, or is exhausted from, the opposite side of said upper cylinder.

7. The structure recited in claim 6 in which the piston of the upper air cylinder is larger than the piston of the lower air cylinder whereby when the same pressure is built-up above the upper piston and below the lower piston, the downward pressure on the upper piston will exceed the upward pressure on the lower piston.

8. A machine for shaping the lid of a metal drum, said machine including a lower platen adapted to receive a lid and movable to an upper and to a lower position, a plurality of lower rolls mounted for rotation about fixed axes and having peripheral forming grooves which are substantially flush with the upper surface of the lower platen when the latter is in its lower position so as to act on the rim of a lid carried by said lower platen, an upper roll located above one of said lower rolls and having a peripheral rib for coacting with the groove of said lower roll, actuating means for driving at least the two last mentioned rolls, an upper platen movable to an upper position and to a lower position, a double-acting air cylinder for raising and lowering said lower platen, a double acting air cylinder for raising and lowering said upper platen, a common source of compressed air, a first pair of pipes for supplying compressed air to the upper and lower sides of the lower air cylinder, a second pair of pipes for supplying compressed air to the upper and lower sides of the upper air cylinder, said second pair of pipes being smaller than said first pair of pipes whereby air pressure is built up in, or is exhausted from, the opposite side of said lower cylinder more quickly than air pressure is built up in, or is exhausted from, the opposite side of said upper cylinder.

9. The structure recited in claim 8 in which said upper roll is movable into and out of engagement with said lower roll, and means for moving said upper roll to either position.

10. The structure recited in claim 8 in which said upper roll is movable toward and away from said lower roll and in which the actuating means for driving the rolls is operative only upon movement of said upper roll toward said lower roll.

11. A machine for shaping the lid of a metal drum, said machine including a lower platen adapted to receive a lid to be shaped, said lower platen being movable to a lower position and to an upper position, an upper platen movable to a lower position for clamping said lid against said lower platen and to an upper position in which said upper platen is spaced from said lower platen even when said lower platen is in its upper position, a first double action air cylinder for actuating said lower platen, a second double acting air cylinder for actuating said upper platen, a first multi-way valve, a second pilot-operated multi-way valve, a third pilot-operated multi-way valve, a common source of compressed air leading directly to the inlets of said first, second and third valves, an operating handle for said first valve movable to a first and to a second position, a first pipe leading from said first valve to the pilot head of said second valve, a second pipe leading from said first valve to the pilot head of said third valve, a third pipe leading from said second valve to the upper side of the lower air cylinder with a branch leading to the underside of the upper air cylinder, and a fourth pipe leading from said third valve to the underside of said lower cylinder with a branch leading to the upper side of the upper air cylinder, the structure and arrangement of the valves and pipes being such that when the handle of the first valve is moved to one position, air is simultaneously supplied to the underside of the first cylinder and to the upper side of the second cylinder and air is exhausted from the upper side of the first cylinder and from the under side of the second and third cylinders, and vice versa.

12. A machine for shaping the lid of a metal drum, said machine including a platform, a plurality of lower bead forming rolls secured to said platform, a lower platen adapted to receive a lid to be shaped, said lower platen being movable to a lower position in which the rim of the lid will be engaged with said rolls and to an upper position in which said lid will be well above said rolls, an upper platen movable to a lower position for clamping said lid against said lower platen and to an upper position in which said upper platen is spaced from said lower platen even when said lower platen is in its upper position, an upper movable roll, a first double action air cylinder for actuating said lower platen, a second double acting air cylinder for actuating said upper platen, a third double acting cylinder for moving said upper roll into, and out of, engagement with one of said lower rolls, a first, multiway valve, a second, pilot-operated multi-way valve, a third, pilot-operated multi-way valve, a fourth, pilot-operated multi-valve, a fifth, multi-way valve, a common source of compressed air directly to the inlets of said first, second and third valves, an operating handle for said first valve movable to a first and to a second position, an operating handle for said fifth valve movable to a first and to a second position, a first pipe leading from said first valve to the pilot head of said second valve, a second pipe leading from said first valve to the pilot head of said third valve, a third pipe leading from said second valve to the upper side of the lower air cylinder with a branch leading to the underside of the upper air cylinder, a fourth pipe leading from said third valve to the underside of said lower cylinder with a branch leading to the upper side of the upper air cylinder, a fifth pipe leading from the upper side of said upper cylinder to said fourth valve with a branch leading to said fifth valve, a sixth pipe leading from said fourth valve to said fifth valve, a seventh pipe leading from said fourth valve to the upper side of said third air cylinder, and an eighth pipe leading from the underside of said third air cylinder to said first pipe, the structure and arrangement of the valves and pipes being such that when the handle of the first valve is moved to one position, air is simultaneously supplied to the underside of the first cylinder and to the upper side of the second cylinder and air is exhausted from the upper side of the first cylinder and from the under side of the second and third cylinders, and vice versa, the arrangement of the valves and pipes being also such that when the handle of the fifth valve is moved to one of its positions air is delivered from the fourth valve to the upper side of the third air cylinder and vice versa.

13. The structure recited in claim 12 in which said third and fourth pipes are of a larger flow capacity than their respective branches whereby the lower air cylinder raises the lower platen before the upper air cylinder begins to lower the upper platen.

14. The structure recited in claim 13 in which the piston of the upper air cylinder is larger than the piston of the lower air cylinder whereby the platens and the lid clamped therebetween are moved jointly to the lower position of the lower platen.

15. The structure recited in claim 12 and actuating means for rotating said rolls, said actuating means including a motor and a normal switch for controlling the motor, said switch being held in open position by said third cylinder in the absence of compressed air in the upper side of said third cylinder.

16. A machine for shaping the lid of a metal drum, said machine including a lower platen adapted to receive a lid and movable to an upper and to a lower position, a first double acting cylinder, a piston in said first double acting cylinder operatively connected to said lower platen, means for supplying fluid under pressure to, and for discharging said fluid from, said first cylinder at a predetermined rate, to raise said lower platen at a predetermined rate of speed, an upper platen movable to a lower and to an upper position, a second double-acting cylinder, a piston in said second cylinder connected to said upper platen, and means for supplying fluid under pressure to, and for discharging fluid from, said second cylinder at a lower predetermined rate, to lower said upper platen at a rate of speed slower than the rate of speed at which said lower platen is raised.

17. The structure recited in claim 16 in which the piston in the second cylinder has a larger area than the piston in the first cylinder.

18. A machine for shaping the lid of a metal drum, said machine including a lower platen adapted to receive a lid and movable to an upper and to a lower position, a first double acting cylinder, a piston in said first double acting cylinder operatively connected to said lower platen, relatively large conduits for supplying fluid under pressure to, and for discharging said fluid from, said first cylinder at a predetermined rate, to raise said lower platen at a predetermined rate of speed, an upper platen movable to a lower and to an upper position, a second double-acting cylinder, a piston in said second cylinder connected to said upper platen, and relatively small conduits for supplying fluid under pressure to, and for discharging fluid from, said second cylinder at a lower predetermined rate, to lower said upper platen at a rate of speed slower than the rate of speed at which said lower platen is raised.

References Cited in the file of this patent

UNITED STATES PATENTS

| Number | Name | Date |
|---|---|---|
| 137,147 | Priest | Mar. 25, 1873 |
| 408,774 | Walsh | Aug. 13, 1889 |
| 854,691 | Duquett | May 21, 1907 |
| 1,344,405 | Jensen | June 22, 1920 |